(12) United States Patent
Hu et al.

(10) Patent No.: US 11,387,696 B2
(45) Date of Patent: Jul. 12, 2022

(54) TANGENTIAL MOTOR, TANGENTIAL MOTOR ROTOR AND ROTOR CORE OF TANGENTIAL MOTOR ROTOR

(71) Applicant: GREE GREEN REFRIGERATION TECHNOLOGY CENTER CO., LTD. OF ZHUHAI, Guangdong (CN)

(72) Inventors: Yusheng Hu, Zhuhai (CN); Yong Xiao, Zhuhai (CN); Jing Wang, Zhuhai (CN); Bin Chen, Zhuhai (CN); Zeyin Mi, Zhuhai (CN); Hui Zhang, Zhuhai (CN)

(73) Assignee: Gree Green Refrigeration Technology Center Co., Ltd. of Zhuhai, Zhuhai (CN)

(*) Notice: Subject to any disclaimer, the term of this patent is extended or adjusted under 35 U.S.C. 154(b) by 149 days.

(21) Appl. No.: 16/636,756

(22) PCT Filed: Dec. 28, 2017

(86) PCT No.: PCT/CN2017/119433
§ 371 (c)(1),
(2) Date: Feb. 5, 2020

(87) PCT Pub. No.: WO2019/029108
PCT Pub. Date: Feb. 14, 2019

(65) Prior Publication Data
US 2020/0169131 A1    May 28, 2020

(30) Foreign Application Priority Data
Aug. 9, 2017  (CN) .......................... 201710676623.4

(51) Int. Cl.
*H02K 1/279* (2022.01)
*H02K 29/03* (2006.01)
*H02K 1/276* (2022.01)

(52) U.S. Cl.
CPC ......... *H02K 1/2773* (2013.01); *H02K 1/2766* (2013.01); *H02K 29/03* (2013.01); *H02K 2213/03* (2013.01)

(58) Field of Classification Search
None
See application file for complete search history.

(56) References Cited

FOREIGN PATENT DOCUMENTS

| CN | 103404001 A | 11/2013 |
|---|---|---|
| CN | 103779990 A | 5/2014 |

(Continued)

OTHER PUBLICATIONS

Nathan Schueth, "Frequently Asked Questions: Which Gas System Length is Best for My AR?", Aug. 23, 2016, faxonfirearms.com (Year: 2016).*

(Continued)

*Primary Examiner* — Quyen P Leung
*Assistant Examiner* — Christopher Stephen Schaller
(74) *Attorney, Agent, or Firm* — Schwegman Lundberg & Woessner, P.A.

(57) ABSTRACT

A tangential motor, a tangential motor rotor and a rotor core thereof are provided. The rotor core includes a rotor body and magnetic steel grooves provided on the rotor body. 2N magnetic isolation holes are provided in a rotor magnetic pole between every two adjacent magnetic steel grooves. The 2N magnetic isolation holes are symmetrically provided at two sides of a magnetic pole center line of the rotor magnetic pole. A width of each of the magnetic isolation holes increases from a circle center of the rotor body to an outer side of the rotor body. Outer side hole surfaces, close to the outer side of the rotor body, of the magnetic isolation holes are arc-shaped surfaces which are concentrically (Continued)

arranged with the rotor body. The rotor core is able to reduce the vibration noise of the motor and increase the efficiency of the motor.

18 Claims, 8 Drawing Sheets

(56) References Cited

FOREIGN PATENT DOCUMENTS

| | | | | |
|---|---|---|---|---|
| CN | 105305760 A | 2/2016 | | |
| CN | 205195521 U | 4/2016 | | |
| CN | 105978245 A * | 9/2016 | ....... | B29C 45/14467 |
| CN | 106100177 A | 11/2016 | | |
| CN | 106160281 A | 11/2016 | | |
| CN | 106571723 A * | 4/2017 | | |
| CN | 106712348 A | 5/2017 | | |
| CN | 107240975 A | 10/2017 | | |
| JP | 2013198215 A | 9/2013 | | |
| WO | WO-2013135257 A2 * | 9/2013 | ............... | H02K 1/02 |
| WO | WO-2014090050 A1 * | 6/2014 | ............... | H02K 1/28 |
| WO | WO-2017105147 A1 * | 6/2017 | ............... | H02K 1/16 |

OTHER PUBLICATIONS

"International Application Serial No. PCT/CN2017/119433, International Search Report dated May 3, 2018", 2 pgs.

"International Application Serial No. PCT/CN2017/119433, Written Opinion dated May 3, 2018", In Chinese Only, 4 pgs.

* cited by examiner

US 11,387,696 B2

TANGENTIAL MOTOR, TANGENTIAL MOTOR ROTOR AND ROTOR CORE OF TANGENTIAL MOTOR ROTOR

CROSS REFERENCE TO RELATED APPLICATIONS

The present disclosure is a national phase entry of PCT/CN2017/119433 filed Dec. 28, 2017, which claims benefit of Chinese Patent Application No. 201710676623.4, filed on Aug. 9, 2017, entitled "Tangential Motor, Tangential Motor Rotor and Rotor Core of Tangential Motor Rotor," the contents of which both are hereby incorporated by reference in their entirety.

TECHNICAL FIELD

The present disclosure relates to a technical field of a motor equipment, and in particular, to a tangential motor, a tangential motor rotor and a rotor core of the tangential motor rotor.

BACKGROUND

Since a tangential permanent magnet synchronous motor has the effect of "magnetism gathering", it can produce a higher air-gap flux density than a radial permanent magnet synchronous motor, so that the motor has the advantages of small volume, light weight, large torque, high power density, high motor efficiency and good dynamic performance, etc., and is more and more used in servo systems, electric traction and other industrial fields and home appliance industry.

At present, the air-gap flux density and back electromotive force of tangential permanent magnet synchronous motor contain various spatial harmonics. Due to the slotting on a stator of the tangential permanent magnet synchronous motor, the magnetic path is not uniform in permeance, the air-gap flux density and the back electromotive force contain various spatial harmonics, the harmonics account for a large proportion, and all the harmonics interact to produce low-order force waves, which increase the vibration noise of the motor. The waveform has poor sine degree and high distortion rate, so that the vibration and noise of the motor are large, which affects the health of a user and limits the application and promotion of the motor.

Therefore, how to reduce the vibration noise of the motor is an urgent problem to be solved by those skilled in the art.

SUMMARY

In view of this, the present disclosure provides a rotor core, intended to reduce the vibration noise of a motor. The present disclosure also provides a tangential motor rotor with the rotor core, and a tangential motor with the rotor core.

To achieve the above objective, the present disclosure provides the technical solution as follows:

a rotor core may include a rotor body and magnetic steel grooves provided on the rotor body. 2N magnetic isolation holes may be provided in a rotor magnetic pole between every two adjacent magnetic steel grooves. The 2N magnetic isolation holes may be symmetrically provided at two sides of a magnetic pole center line of the rotor magnetic pole.

A width of each of the magnetic isolation holes may increase from a circle center of the rotor body to an outer side of the rotor body. Outer side hole surfaces, close to the outer side of the rotor body, of the magnetic isolation holes may be arc-shaped surfaces which are concentrically arranged with the rotor body.

In an exemplary embodiment, in the rotor core, a minimum distance between the each of the magnetic isolation holes and a corresponding magnetic steel groove may be less than or equal to 1.5D, D being an air gap length of the rotor core fitting with a stator.

In an exemplary embodiment, in the rotor core, a first magnetic isolation bridge may be formed between the outer side hole surface of the each of the magnetic isolation holes and an outer wall of the rotor body, a width of the first magnetic isolation bridge may be A, and an air gap length of the rotor core fitting with a stator may be D.

$$1.5 \geq A/D \geq 1.$$

In an exemplary embodiment, in the rotor core, a second magnetic isolation bridge may be formed between the each of the magnetic isolation holes and the corresponding magnetic steel groove, and a width of an outer side of the second magnetic isolation bridge may be greater than a width of an inner side of the second magnetic isolation bridge.

In an exemplary embodiment, in the rotor core, the width of the second magnetic isolation bridge close to the outer side of the rotor body may be I, and an air gap length of the rotor core fitting with a stator may be D.

$$8 \geq I/D \geq 5.$$

In an exemplary embodiment, in the rotor core, a length of the each of the magnetic isolation holes in a radial direction of the rotor body may be J, and an air gap length of the rotor core fitting with a stator may be D.

$$5.5 \geq J/D \geq 3.$$

In an exemplary embodiment, in the rotor core, a maximum width of the each of the magnetic isolation holes may be K, and an air gap length of the rotor core fitting with a stator may be D.

$$2 \geq K/D \geq 1.5.$$

In an exemplary embodiment, in the rotor core, a second magnetic isolation bridge may be formed between the each of the magnetic isolation holes and the a corresponding magnetic steel groove, and the second magnetic isolation bridge may be an equal-width magnetic isolation bridge.

In an exemplary embodiment, in the rotor core, a width of the second magnetic isolation bridge may be B, and an air gap length of the rotor core fitting with a stator may be D.

$$1.2 \geq B/D \geq 0.9.$$

In an exemplary embodiment, in the rotor core, the number of magnetic pole pairs of the motor may be P, a maximum width of the each of the magnetic isolation holes may be H, a maximum angle between the each of the magnetic isolation holes and a center line of a magnetic steel groove adjacent to the magnetic isolation hole may be θ2, the magnetic steel groove may have an opening toward the outer side of the rotor body, a width of the opening may be L, the opening may be provided symmetrically with respect to a center line of the magnetic steel groove, and an angle between an edge of one side of the opening and the center line of the magnetic steel groove may be θ1.

$$0.2 \leq \frac{2H}{L} * \frac{\sin\left(\theta 1 - \frac{\theta 2 - \theta 1}{P}\right)}{\sin \theta 1} \leq 0.6$$

In an exemplary embodiment, the rotor core may further include auxiliary magnetic isolation holes symmetrically provided along the magnetic pole center line of the rotor body.

In an exemplary embodiment, the rotor core may further include a fixing hole provided in the rotor magnetic pole between the every two adjacent magnetic steel grooves and configured to fix a rotor punching sheet.

The auxiliary magnetic isolation hole may be located on an outer side of the fixing hole in a radial direction of the rotor body.

In an exemplary embodiment, in the rotor core, a width of the auxiliary magnetic isolation hole may gradually increase from an outer side of the rotor body to a circle center of the rotor body.

In an exemplary embodiment, in the rotor core, an inner side hole surface, close to a circle center of the rotor body, of the auxiliary magnetic isolation hole may be provided with a protruding portion protruding toward an outer side of the rotor body.

In an exemplary embodiment, in the rotor core, a length of the auxiliary magnetic isolation hole may be F, and a length of the each of the magnetic isolation holes may be C.

$$0.7 \geq C/F \geq 0.2.$$

In an exemplary embodiment, in the rotor core, $0.6 \geq C/F \geq 0.4$.

In an exemplary embodiment, in the rotor core, an additional magnetic isolation groove may be provided between the each of the magnetic steel grooves and a shaft hole of the rotor body, and a third magnetic isolation bridge may be formed between the additional magnetic isolation groove and the corresponding magnetic steel groove.

The present disclosure provides a tangential motor rotor, which may include a rotor core and a tangential magnetized permanent magnet disposed in a magnetic steel groove of the rotor core. The rotor core may be the above rotor core.

In an exemplary embodiment, in the tangential motor rotor, a width of the tangential magnetized permanent magnet close to an outer side of the rotor core may be greater than a width of the tangential magnetized permanent magnet close to a circle center of the rotor core.

The present disclosure also provides a tangential motor, which may include a tangential motor rotor and a stator. The tangential motor rotor may be the above tangential motor rotor.

It can be seen from the above technical solution that according to the rotor core provided by the present disclosure, the outer side hole surfaces, close to the outer side of the rotor body, of the magnetic isolation holes are arc-shaped surfaces which are concentrically arranged with the rotor body. Therefore, a distance is reserved between the magnetic isolation holes and the outer wall of the rotor body to form the first magnetic isolation bridge with uniform thickness. The magnetic isolation effect of the magnetic isolation holes is effectively ensured. By providing the magnetic isolation holes, the magnetic flux direction of the rotor magnetic pole is effectively improved, the sine degree of the air-gap flux density and back electromotive force waveforms is improved, the harmonic ratio and the harmonic loss are reduced, the vibration noise of the motor is reduced, and the motor efficiency is improved.

The present disclosure also provides a motor with the tangential motor rotor. Since the tangential motor rotor has the above technical effects, the motor with the tangential motor rotor should have the same technical effects, and will not be further described herein.

BRIEF DESCRIPTION OF THE DRAWINGS

In order to make the content of the present disclosure easier to understand, the present disclosure will be further described in detail below according to the specific embodiments of the present disclosure and the accompanying drawings, where.

DETAILED DESCRIPTION OF THE EMBODIMENTS

The present disclosure discloses a tangential motor rotor, intended to improve the heating effect and the heating efficiency. The present disclosure also provides a motor having the tangential motor rotor.

The technical solutions in the embodiments of the present disclosure are clearly and completely described in the following with reference to the accompanying drawings in the embodiments of the present disclosure. It is apparent that the described embodiments are merely a part of the embodiments of the present disclosure, but not all of the embodiments. All other embodiments obtained by those of ordinary skill in the art based on the embodiments of the present disclosure without creative efforts should fall within the scope of protection of the present disclosure.

Figure 1:
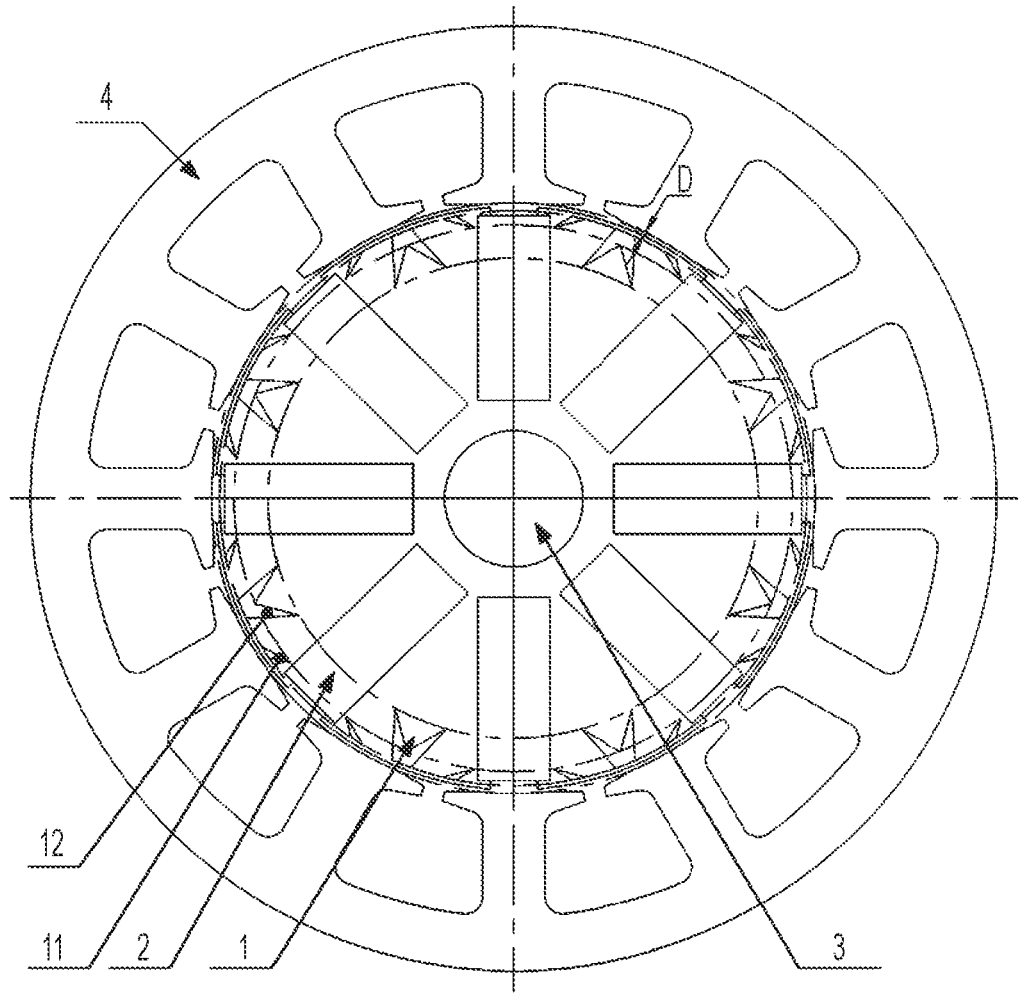
FIG. 1 is a schematic structure diagram of a tangential motor according to an embodiment of the present disclosure.

Referring to FIG. 1, an embodiment of the present disclosure provides a rotor core, which includes a rotor body 1 and magnetic steel grooves 2 provided on the rotor body 1. 2N magnetic isolation holes 11 are provided in a rotor magnetic pole between every two adjacent magnetic steel grooves 2. The 2N magnetic isolation holes 11 are symmetrically provided at two sides of a magnetic pole center line of the rotor magnetic pole. The width of each of the magnetic isolation holes 11 increases from a circle center of the rotor body 1 to an outer side of the rotor body 1. Outer side hole surfaces, close to the outer side of the rotor body 1, of the magnetic isolation holes 11 are arc-shaped surfaces which are concentrically arranged with the rotor body 1.

According to the rotor core provided by the embodiment of the present disclosure, the outer side hole surfaces, close to the outer side of the rotor body 1, of the magnetic isolation holes 11 are arc-shaped surfaces which are concentrically arranged with the rotor body 1. Therefore, a distance is reserved between the magnetic isolation holes 11 and the outer wall of the rotor body 1 to form a first magnetic isolation bridge 14, and the first magnetic isolation bridge 14 has uniform thickness. The magnetic isolation effect of the magnetic isolation holes 11 is effectively ensured. By providing the magnetic isolation holes 11, the magnetic flux direction of the rotor magnetic pole is effectively improved, the sine degree of the air-gap flux density and back electromotive force waveforms is improved, the harmonic ratio and the harmonic loss are reduced, the vibration noise of the motor is reduced, and the motor efficiency is improved.

Figure 5:
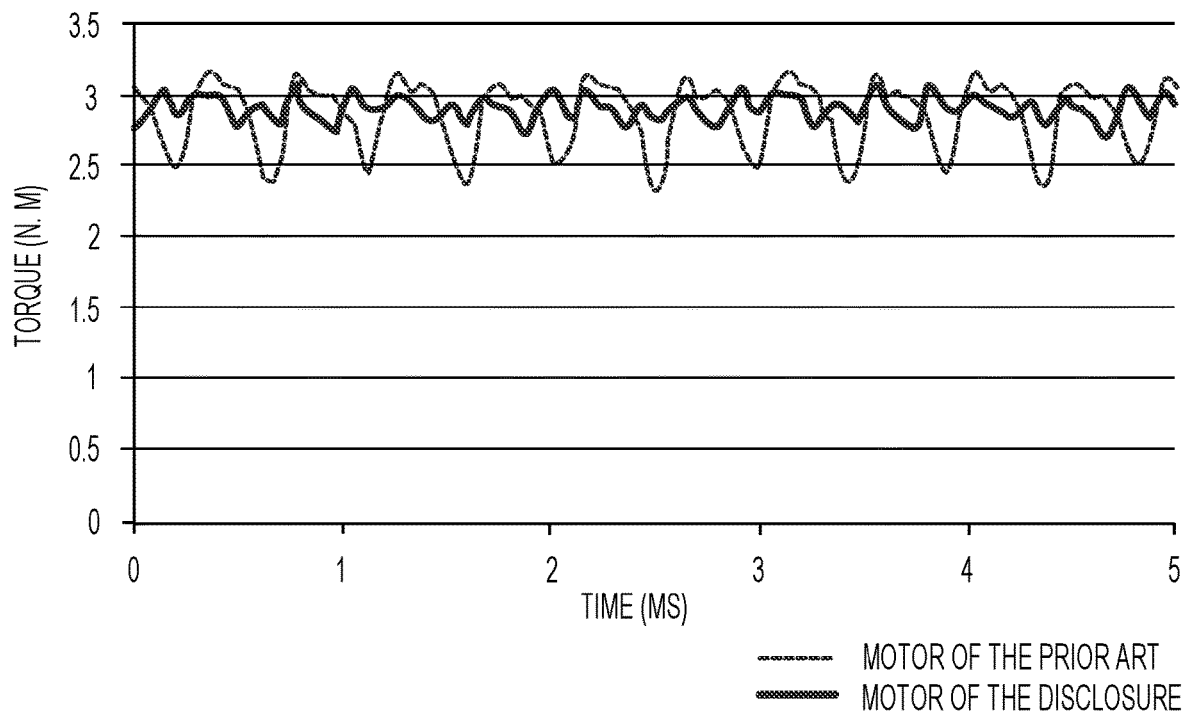
FIG. 5 is a comparison diagram of torque ripple of a tangential motor according to an embodiment of the present disclosure and a tangential motor in the prior art.

As shown in FIG. 5, a motor with the rotor core provided by the embodiment of the present disclosure has a significantly higher torque stability than the existing motor.

In some embodiments, since the distance between the magnetic isolation hole 11 and the magnetic steel groove 2 is not able to be too large in order to form a second magnetic isolation bridge 15 therebetween, a minimum distance between the each of the magnetic isolation holes 11 and the corresponding magnetic steel groove 2 is less than or equal to 1.5D, D being a gas length of the rotor core fitting with a stator 4.

Figure 6:
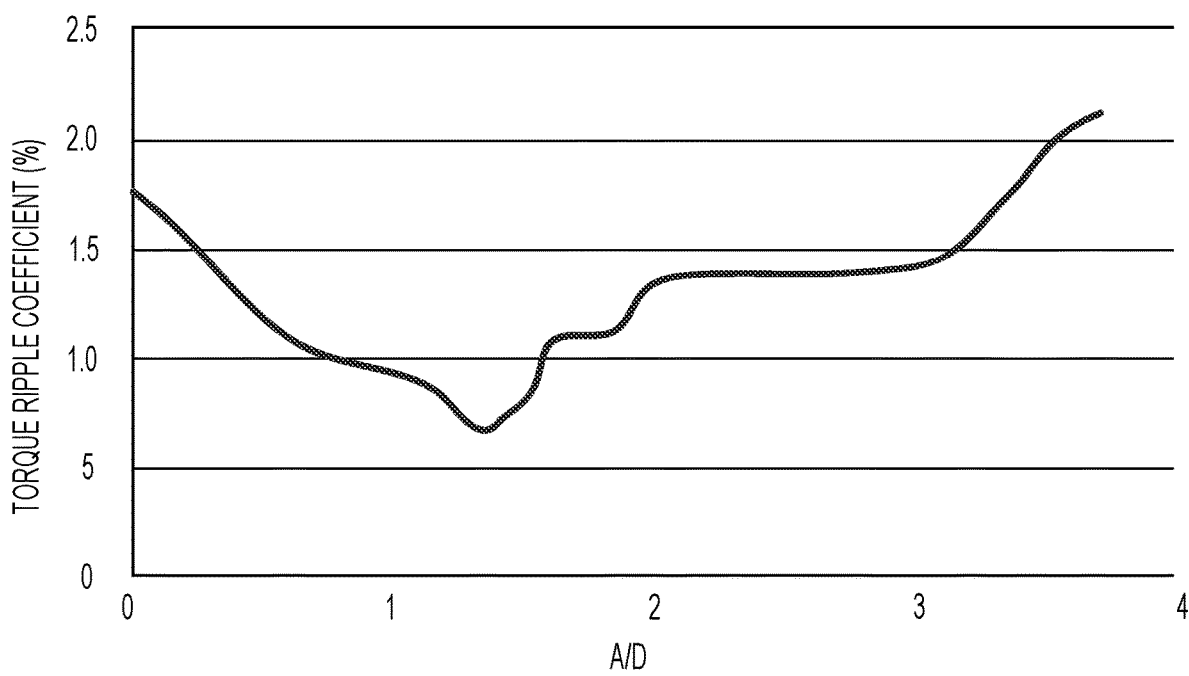
FIG. 6 is a diagram showing a relationship between a torque ripple coefficient of a tangential motor and A/D according to an embodiment of the present disclosure.

In some embodiments, a first magnetic isolation bridge 14 is formed between the outer side hole surface of the each of the magnetic isolation holes 11 and an outer wall of the rotor body 1, the width of the first magnetic isolation bridge 14 is A, and an air gap length of the rotor core fitting with a stator is D. It has been found through studies that the influence of the distance between the magnetic isolation hole 11 and the outer wall of the rotor body 1 on the torque ripple is as shown in FIG. 6. When A/D≥1, a small amount of magnetic flux is allowed to be transmitted through the first magnetic isolation bridge 14, which improves the magnetic flux direction in the magnetic pole, improves the distribution of an air-gap magnetic field of the motor, reduces the harmonic ratio, the vibration noise of the motor and the harmonic loss, and improves the motor efficiency. When A/D<1, since the magnetic isolation hole 11 is too close to the outer wall of the rotor body 1, the width A of the first magnetic isolation bridge 14 is too small, which is equivalent to adding a groove on the outer wall of the rotor body 1, thereby improving the tooth and groove effects of the stator and the rotor to increase the torque ripple of the motor. However, when A/D>1.5, the width of the first magnetic bridge 14 is large, and most of the magnetic flux can still be transmitted to an air gap through the magnetic isolation bridge, the influence on the improvement of the air-gap magnetic field distribution is less, the harmonic ratio is still large, and the vibration noise of the motor is not reduced. Therefore, in the present embodiment, 1.5≥A/D≥1.

In the rotor core provided by the present embodiment, a second magnetic isolation bridge 15 is formed between the each of the magnetic isolation holes 11 and the corresponding magnetic steel groove 2, and the width of the outer side of the second magnetic isolation bridge 15 is greater than the width of the inner side of the second magnetic isolation bridge 15.

Figure 7:
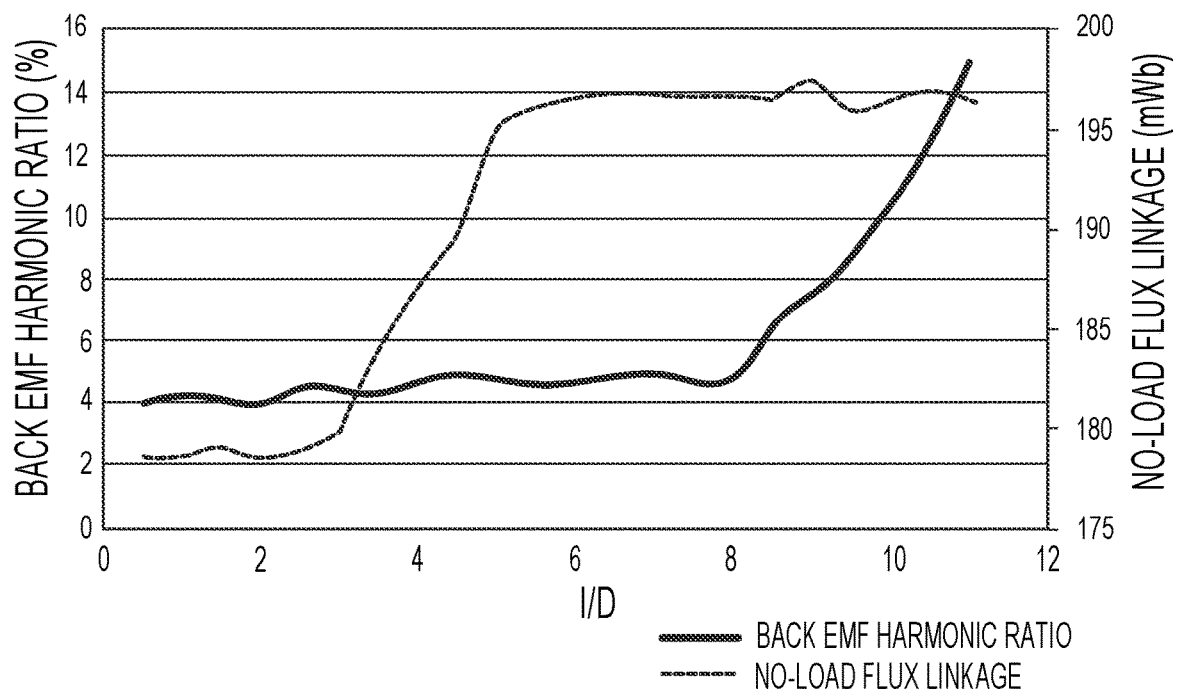
FIG. 7 is a diagram showing a relationship between a back EMF (electromotive force) harmonic ratio and I/D as well as no-load flux linkage of a tangential motor and I/D according to an embodiment of the present disclosure.

In some embodiments, the width of the second magnetic isolation bridge 15 close to the outer side of the rotor body 1 is I, and an air gap length of the rotor core fitting with a stator is D. It has been found through simulation studies that the magnetic isolation hole 11 is close to the magnetic steel groove 2, and the magnetic isolation hole 11 is filled with air. Therefore, the magnetic isolation hole 11 may change the direction of the magnetic flux of a permanent magnet in a rotor magnetic pole. When the second magnetic isolation bridge 15 is designed to have a wide upper part and a narrow lower part, it has been found through studies that the width I of the second magnetic bridge 15 close to the outer side of the rotor body 1 has a greater influence on the back EMF (electromotive force) harmonic ratio of the motor and the no-load flux linkage. As shown in FIG. 7, when I/D is less than 5, the magnetic isolation hole 11 blocks a flux linkage line generated by an end portion, close to the outer side of the rotor body 1, of the permanent magnet from entering the stator, thereby reducing the no-load flux linkage of the motor. However, when I/D is greater than 8, the effect of improving the air-gap magnetic field is deteriorated. Therefore, preferably, when 8≥I/D≥5, the magnetic flux direction in the rotor magnetic pole can be further improved, so that the air-gap magnetic field distribution is more uniform, the harmonic ratio is lower, the vibration noise of the motor is lower, and the motor can obtain a large no-load flux linkage. Meanwhile, the width of the lower side of the magnetic isolation bridge 2 is smaller than the width of the upper side of the magnetic isolation bridge, and the width of the lower side of the second magnetic isolation bridge 15 is greater than 0.5 mm, which increases the connection width between the magnetic isolation hole 11 and the magnetic steel groove 2, and improves the mechanical structural strength of the motor rotor. Therefore, 8≥I/D≥5.

Figure 8:
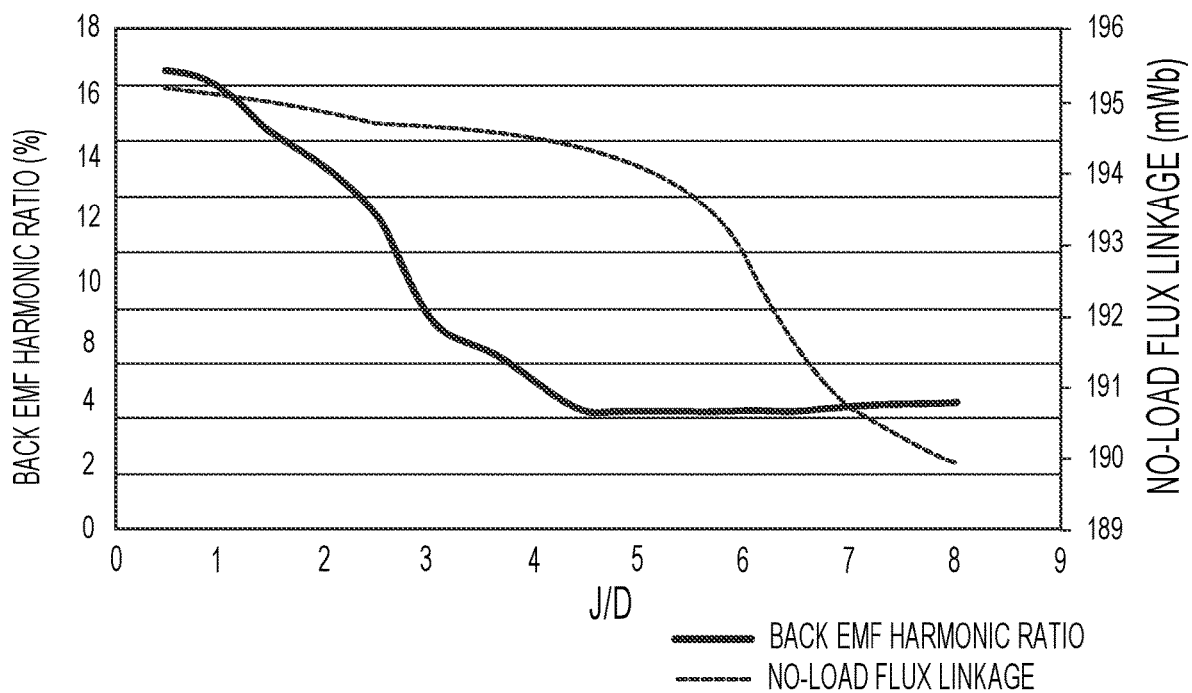
FIG. 8 is a diagram showing a relationship between a back EMF harmonic ratio and J/D as well as no-load flux linkage of a tangential motor and J/D according to an embodiment of the present disclosure.

The length of the each of the magnetic isolation holes 11 in a radial direction of the rotor body 1 is J, and an air gap length of the rotor core fitting with a stator is D. It has been found through studies that the longer the length J of the magnetic isolation hole 11 is, the greater influence on a magnetic flux transmission path of the permanent magnet is. As shown in FIG. 8, when J/D≥3, the magnetic flux direction in the rotor can be effectively limited, the distribution of the air-gap magnetic field can be optimized, and the harmonic ratio and the vibration noise of the motor can be reduced. However, when J/D>5.5, the magnetic isolation hole 11 has a large magnetic isolation to the permanent magnet, so that the flux linkage and torque of the motor are reduced, and the efficiency of the motor is reduced. Therefore, in the present embodiment, preferably, 5.5≥J/D≥3.

Preferably, the maximum width of the each of the magnetic isolation holes 11 is K, and an air gap length of the rotor core fitting with a stator is D. It has been found through simulation studies that the width K of the magnetic isolation hole 11 has a great influence on the air-gap flux density and the back EMF harmonic ratio. Since the magnetic isolation hole 11 is close to the air gap, the width K of the magnetic isolation hole 11 can change the magnitude of the magnetic flux of the rotor magnetic pole transmitted to the air gap in the circumferential direction, thereby changing the air-gap magnetic field distribution. When K/D≥1.5, the magnetic flux is transmitted less along the magnetic isolation hole 11 and the magnetic isolation hole at the magnetic pole center line, and the magnetic flux is transmitted more along a core portion between the magnetic isolation hole 11 and the magnetic isolation hole at the magnetic pole center line. At this time, the magnetic flux direction and the air-gap magnetic field distribution of the magnetic path are improved, the sine degree of the air-gap magnetic density waveform is improved, the back EMF harmonic ratio, the vibration noise of the motor and the harmonic loss are reduced, and the motor efficiency is improved. However, when K/D>2, the core portion between the magnetic isolation hole 11 and the magnetic isolation hole at the magnetic pole center line is too small, and the magnetic flux is highly concentrated here, so that the air-gap magnetic density here is increased, the air-gap magnetic density waveform is distorted again, the harmonic ratio is increased, and the vibration noise of the motor is increased. Preferably, 2≥K/D≥1.5.

Figure 3:
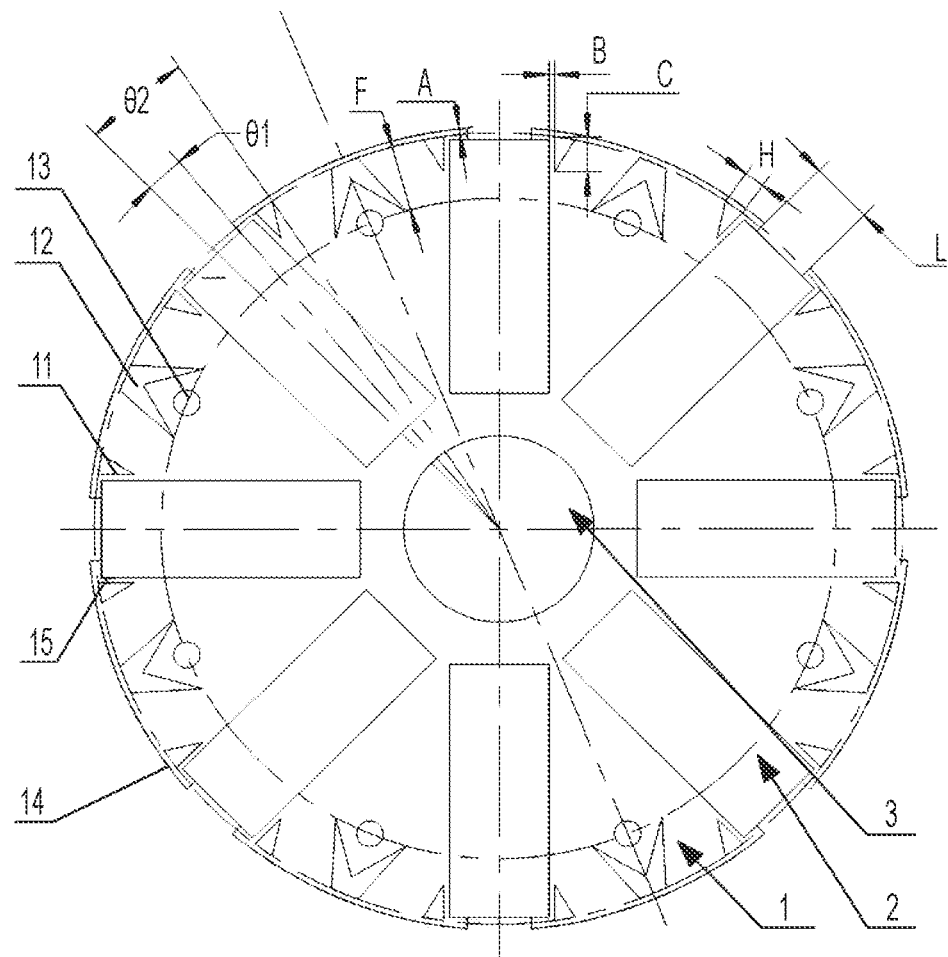
FIG. 3 is a schematic structure diagram of a tangential motor rotor core according to an embodiment of the present disclosure.
Figure 3A:
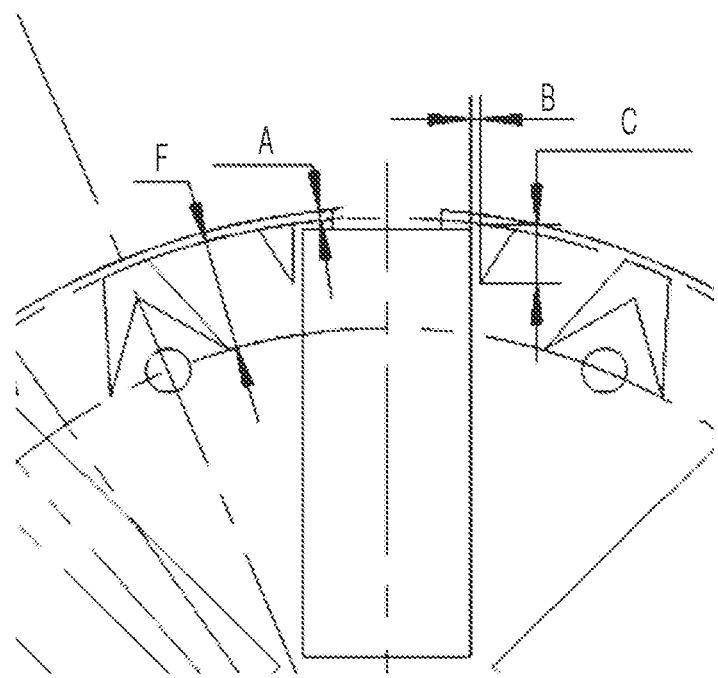
FIG. 3A is an enlarged view of an upper portion of FIG. 3.
Figure 3B:
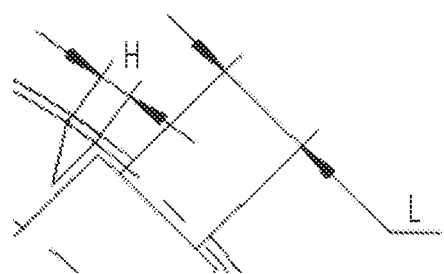
FIG. 3B is an enlarged view of an upper-right portion of FIG. 3.

As shown in FIG. 3, in the present embodiment, since a solid portion of the rotor body 1 is provided between the magnetic isolation hole 11 and the magnetic steel groove 2, a second magnetic isolation bridge 15 is formed between the each of the magnetic isolation holes 11 and the magnetic steel groove 2, and the second magnetic isolation bridge 15 is an equal-width magnetic isolation bridge.

Preferably, the width of the second magnetic isolation bridge 15 is B, and an air gap length of the rotor core fitting with a stator is D. It has been found through simulation studies that the width of the second magnetic isolation bridge 15 is uniform, which can further restrict transmission of the magnetic flux, close to the outer side of the rotor, of the permanent magnet to the air gap, and improve the distribution of the air-gap magnetic field. When B/D□0.9, a small amount of magnetic flux is allowed to be transmitted through the second magnetic isolation bridge 15 to the air gap, thereby improving the permeance uniformity of the magnetic path and the sine degree of the air-gap flux density waveform, and reducing the air-gap flux density, the back EMF harmonic ratio and the torque ripple, which reduces the vibration noise of the motor and the harmonic loss, and improves the motor efficiency. However, when B/D>1.2, the width B of the second magnetic isolation bridge 15 is too large, the magnetic flux transmitted to the air gap through the second magnetic isolation bridge 15 is excessive, the air-gap flux density here is increased, the sine degree of the air-gap flux density waveform is deteriorated, the harmonic ratio is increased, and the vibration noise of the motor is increased. Therefore, 1.2≥B/D≥0.9.

Further, the number of magnetic pole pairs of the motor is P, the maximum width of the each of the magnetic isolation holes 11 is H, a maximum angle between the each of the magnetic isolation holes 11 and a center line of the adjacent magnetic steel groove 2 is θ2, the magnetic steel groove 2 has an opening toward the outer side of the rotor body 1, the width of the opening is L, the opening is provided symmetrically with respect to the center line of the magnetic steel groove 2, and an angle between the edge of one side of the opening and the center line of the magnetic steel groove 2 is θ1, where $$0.2 \leq \frac{2H}{L} * \frac{\sin\left(\theta 1 - \frac{\theta 2 - \theta 1}{P}\right)}{\sin \theta 1} \leq 0.6.$$

When the above conditions are satisfied, the air-gap permeance uniformity is better, the magnetic transfer of the motor is evenly transitioned, the torque ripple of the motor is lower, the sine degree of the air-gap flux density waveform is better, the harmonic ratio is relatively low, and the vibration noise of the motor is effectively reduced.

The embodiment of the present disclosure also provides a rotor core, which further includes auxiliary magnetic isolation holes 12 symmetrically provided along the magnetic pole center line of the rotor body 1. By adding the auxiliary magnetic isolation hole 12, the magnetic isolation effect is further improved.

Further, the rotor core in the present embodiment further includes a fixing hole 13 provided in the rotor magnetic pole between every two adjacent magnetic steel grooves 2 and configured to fix a rotor punching sheet. The auxiliary magnetic isolation hole 12 is located on the outer side of the fixing hole 13 in the radial direction of the rotor body 1. A fixing member is disposed in the fixing hole 13. When the fixing hole 13 is a rivet hole, the fixing member is a rivet. When the fixing hole 13 is a screw hole, a structural reinforcing rod connecting the rotor punching sheet is inserted into the screw hole. It is also possible to provide the fixing hole 13 as other types of holes, such as threaded holes, prism holes or elliptical holes.

Preferably, the width of the auxiliary magnetic isolation hole 12 gradually increases from the outer side of the rotor body 1 to the circle center of the rotor body 1.

Figure 2:
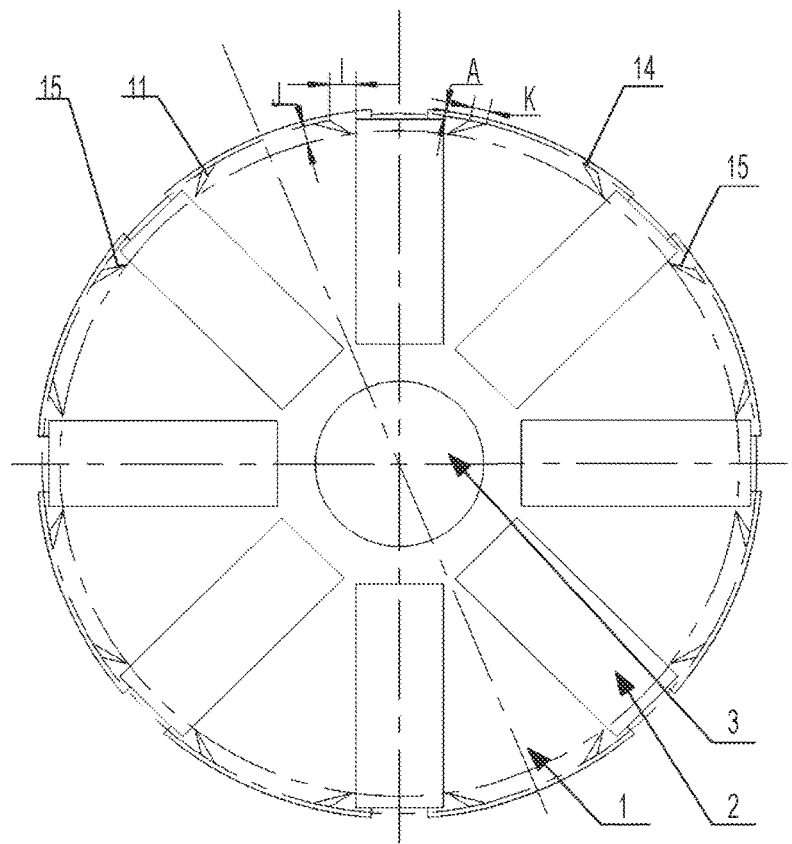
FIG. 2 is a first schematic structure diagram of a tangential motor rotor according to an embodiment of the present disclosure.
Figure 2A:
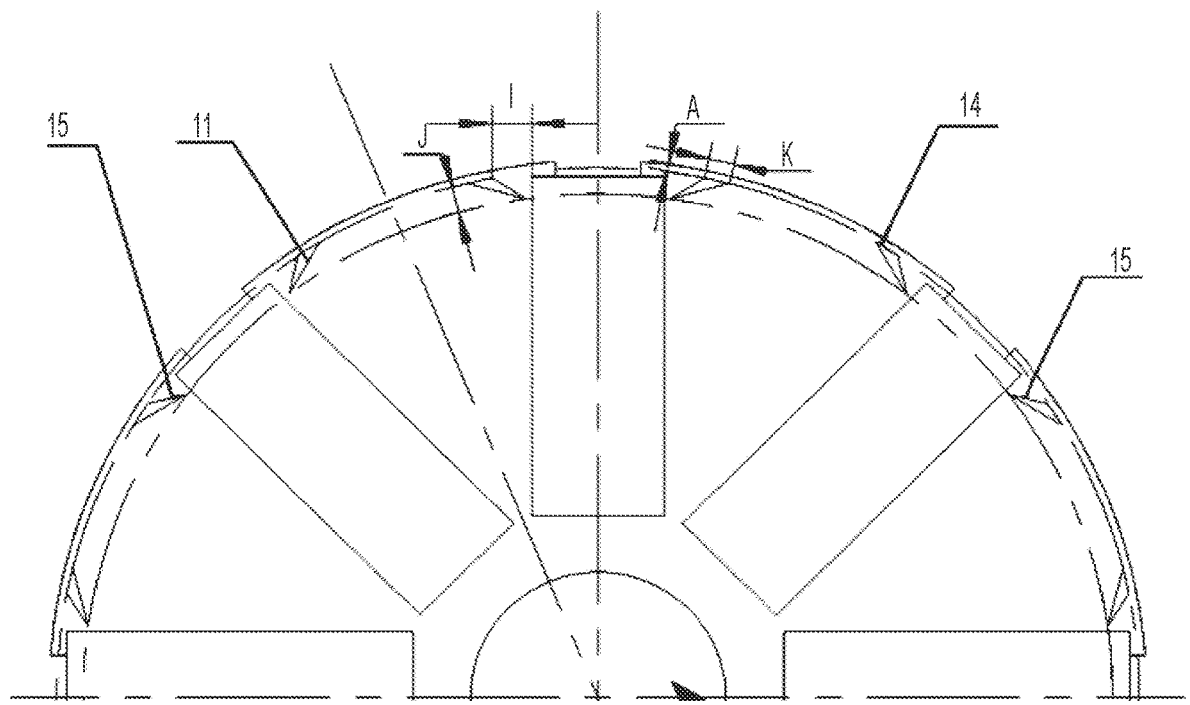
FIG. 2A is an enlarged view of a portion of FIG. 2.

As shown in FIG. 2, in the present embodiment, an inner side hole surface, close to the circle center of the rotor body 1, of the auxiliary magnetic isolation hole 12 is provided with a protruding portion protruding toward the outer side of the rotor body 1. By providing the protruding portion, the fixing hole 13 can be avoided, the arrangement of the fixing hole 13 and the auxiliary magnetic isolation hole 12 is facilitated, and the mechanical strength of the rotor core is also ensured.

In the present embodiment, the protruding portion is a pointed protrusion. Of course, it is also possible to set the protruding portion as a rounded protrusion or a polygonal corner protrusion.

Figure 9:
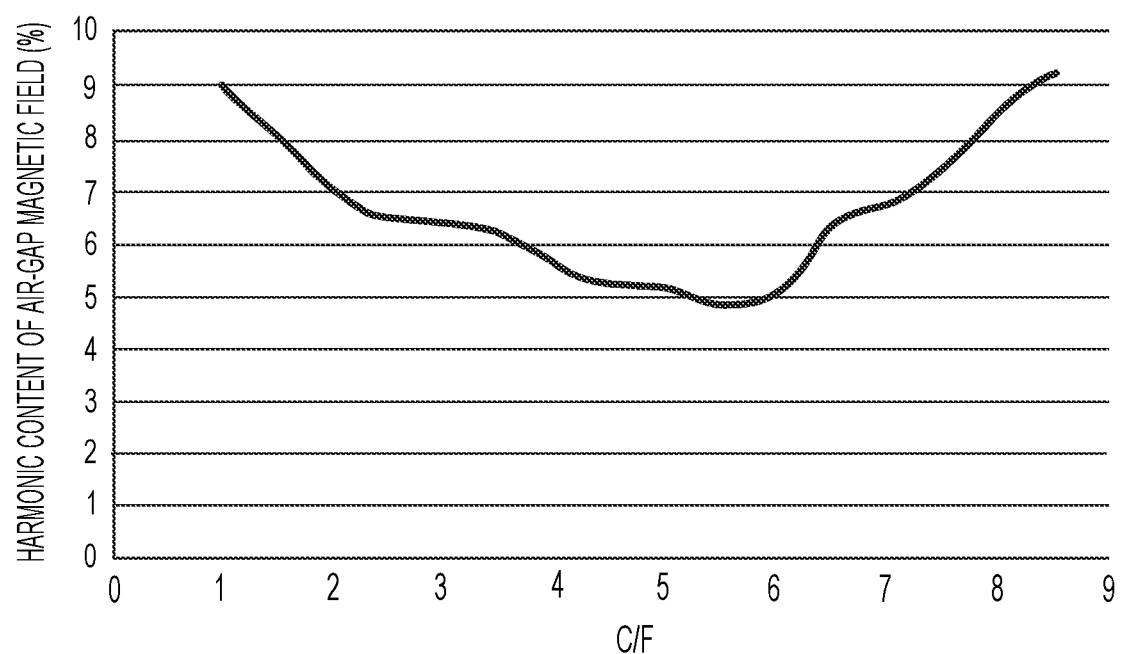
FIG. 9 is a diagram showing a relationship between the harmonic content of an air-gap magnetic field of a tangential motor and C/F according to an embodiment of the present disclosure.

Preferably, the length of the auxiliary magnetic isolation hole 12 is F, and the length of the each of the magnetic isolation holes 11 is C. It has been found through simulation studies that the ratio of the length of the magnetic isolation hole to the length of the magnetic isolation hole at the magnetic pole center line has a greater influence on the back EMF harmonic ratio. Since the magnetic isolation bridge 2 is equally wide, the magnetic isolation hole is lengthened, and the influence on the external magnetic flux path of the permanent magnet is further increased. As shown in FIG. 9, when 0.7≥C/F≥0.2, the magnetic flux direction of the rotor magnetic pole close to the air gap is further improved, the air-gap magnetic field distribution is further improved, the torque ripple is further reduced, the vibration noise of the motor is further reduced, the harmonic loss is further reduced, and the motor efficiency is further improved. Preferably, 0.7≥C/F≥0.2.

The length F of the auxiliary magnetic isolation hole 12 is the distance between the closest point of the auxiliary magnetic isolation hole 12 from the outside of the rotor body 1 and the closest point of the auxiliary magnetic isolation hole 12 from the circle center of the rotor body 1. The length C of the magnetic isolation hole 11 is the distance between the closest point of the magnetic isolation hole 11 from the outside of the rotor body 1 and the closest point of the magnetic isolation hole 11 from the circle center of the rotor body 1.

Further, 0.6≥C/F≥0.4.

Figure 4:
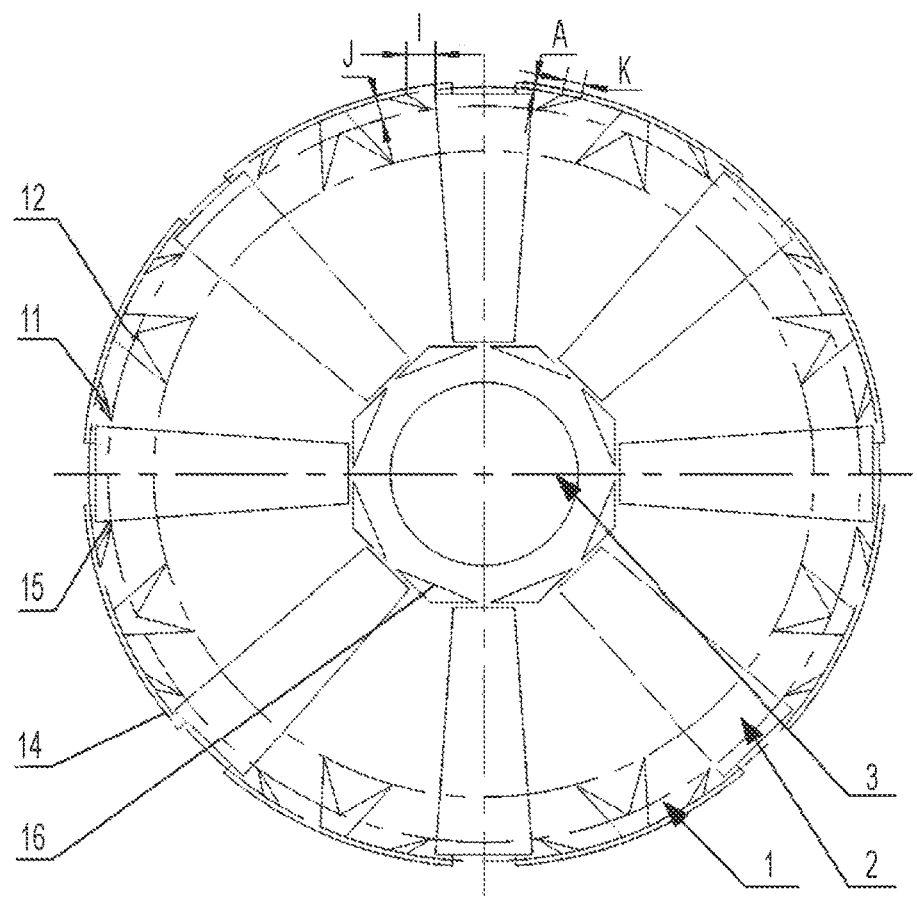
FIG. 4 is a schematic structure diagram of a tangential motor rotor core according to an embodiment of the present disclosure.
Figure 4A:
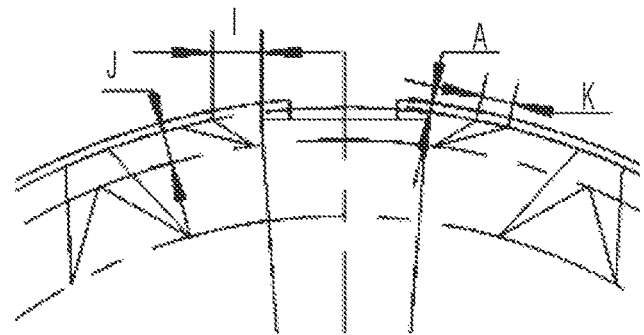
FIG. 4A is an enlarged view of an upper portion of FIG. 4.

As shown in FIG. 4, an additional magnetic isolation groove 16 is provided between the each of the magnetic steel grooves 2 and a shaft hole 3 of the rotor body 1, and a third magnetic isolation bridge is formed between the additional magnetic isolation groove 16 and the corresponding magnetic steel groove 2. Through the above settings, the magnetization saturation of the permanent magnet is effectively improved.

The embodiment of the present disclosure provides a tangential motor rotor, which includes a rotor core and a tangential magnetized permanent magnet disposed in a magnetic steel groove of the rotor core. The rotor core is the rotor core according to any one of the above. Since the rotor core has the above technical effects, the tangential motor rotor with the rotor core should have the same technical effects, and will not be further described herein.

Preferably, the width of the tangential magnetized permanent magnet close to the outer side of the rotor core is greater than the width thereof close to the circle center of the rotor core. Through the above settings, the anti-demagnetization capability of the motor is effectively improved.

The embodiment of the present disclosure also provides a tangential motor, which includes a tangential motor rotor and a stator. The tangential motor rotor is the tangential motor rotor according to the above. Since the tangential motor rotor has the above technical effects, the tangential motor with the tangential motor rotor should have the same technical effects, and will not be further described herein.

The technical features of the above-described embodiments may be arbitrarily combined. For the sake of brevity of description, all possible combinations of the technical features in the above embodiments are not described. However, as long as there is no contradiction between the combinations of these technical features, all should be considered as the scope of this description.

The above embodiments are merely illustrative of several implementation manners of the present disclosure with specific and detailed description, and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A rotor core, comprising a rotor body (1) and magnetic steel grooves (2) provided on the rotor body (1), wherein an even amount of magnetic isolation holes (11) are provided in a rotor magnetic pole between every two adjacent magnetic steel grooves (2), and the even amount of magnetic isolation holes (11) are symmetrically provided at two sides of a magnetic pole center line of the rotor magnetic pole;
   a width of each of the magnetic isolation holes (11) increases from a circle center of the rotor body (1) to an outer side of the rotor body (1), and outer side hole surfaces, closer to the outer side of the rotor body (1) than the circle center of the rotor body (1), of each of the magnetic isolation holes (11) are arc-shaped surfaces which are concentrically arranged with the rotor body (1); and
   a second magnetic isolation bridge (15) is formed between the each of the magnetic isolation holes (11) and a corresponding magnetic steel groove (2), and a width of an outer side of the second magnetic isolation bridge (15) is greater than a width of an inner side of the second magnetic isolation bridge (15).

2. The rotor core as claimed in claim 1, wherein a minimum distance between the each of the magnetic isolation holes (11) and a corresponding magnetic steel groove (2) is less than or equal to 1.5D, D being an air gap length of the rotor core fitting with a stator.

3. The rotor core as claimed in claim 1, wherein a first magnetic isolation bridge (14) is formed between the outer side hole surface of the each of the magnetic isolation holes (11) and an outer wall of the rotor body (1), a width of the first magnetic isolation bridge (14) is A, and an air gap length of the rotor core fitting with a stator is D;

$$1.5 \geq A/D \geq 1.$$

4. The rotor core as claimed in claim 1, wherein the width of the second magnetic isolation bridge (15) close to the outer side of the rotor body (1) is I, and an air gap length of the rotor core fitting with a stator is D;

$$8 \geq I/D \geq 5.$$

5. The rotor core as claimed in claim 1, wherein a length of the each of the magnetic isolation holes (11) in a radial direction of the rotor body (1) is J, and an air gap length of the rotor core fitting with a stator is D;

$$5.5 \geq J/D \geq 3.$$

6. The rotor core as claimed in claim 1, wherein a maximum width of the each of the magnetic isolation holes (11) is K, and an air gap length of the rotor core fitting with a stator is D;

$$2 \geq K/D \geq 1.5.$$

7. The rotor core as claimed in claim 1, wherein a second magnetic isolation bridge (15) is formed between the each of the magnetic isolation holes (11) and a corresponding magnetic steel groove (2) closer to the each of the magnetic isolation holes, and each of the second magnetic isolation bridges (15) is an equal-width magnetic isolation bridge.

8. The rotor core as claimed in claim 7, wherein a width of the second magnetic isolation bridge (15) is B, and an air gap length of the rotor core fitting with a stator is D;

$$1.2 \geq B/D \geq 0.9.$$

9. The rotor core as claimed in claim 1, wherein the number of magnetic pole pairs of the rotor body is P, a maximum width of each of the magnetic isolation holes (11) is H, a maximum angle between a center line of each of the magnetic steel grooves (2) and each of the magnetic isolation holes (11) adjacent to the center line of each of the magnetic steel grooves (2) is θ2, each of the magnetic steel grooves (2) has an opening toward the outer side of the rotor body (1), a width of the opening is L, the opening is provided symmetrically with respect to the center line of respective magnetic steel grooves (2), and an angle between an edge of one side of the opening and the center line of each of the magnetic steel grooves (2) is θ1;

$$0.2 \leq \frac{2H}{L} * \frac{\sin\left(\theta 1 - \frac{\theta 2 - \theta 1}{P}\right)}{\sin \theta 1} \leq 0.6.$$

10. A rotor core, comprising a rotor body (1) and magnetic steel grooves (2) provided on the rotor body (1), wherein an even amount of magnetic isolation holes (11) are provided in a rotor magnetic pole between every two adjacent magnetic steel grooves (2), and the even amount of magnetic isolation holes (11) are symmetrically provided at two sides of a magnetic pole center line of the rotor magnetic pole;

a width of each of the magnetic isolation holes (11) increases from a circle center of the rotor body (1) to an outer side of the rotor body (1), and outer side hole surfaces, close to the outer side of the rotor body (1), of the magnetic isolation holes (11) are arc-shaped surfaces which are concentrically arranged with the rotor body (1); and auxiliary magnetic isolation holes (12) symmetrically provided along a magnetic pole center line of the rotor body (1), wherein a length of each of the auxiliary magnetic isolation holes (12) is F, and a length of the each of the magnetic isolation holes (11) is C;

$$0.7 \geq C/F \geq 0.2.$$

11. The rotor core as claimed in claim 10, further comprising a fixing hole (13) provided in the rotor magnetic pole between the every two adjacent magnetic steel grooves (2) and configured to fix a rotor punching sheet; and each of the auxiliary magnetic isolation holes (12) is located on an outer side of the fixing hole (13) in a radial direction of the rotor body (1).

12. The rotor core as claimed in claim 10, wherein a width of each of the auxiliary magnetic isolation holes (12) gradually increases from the outer side of the rotor body (1) to the circle center of the rotor body (1).

13. The rotor core as claimed in claim 10, wherein an inner side hole surface, closer to the circle center of the rotor body (1) than the outer side of the rotor body (1), of each of the auxiliary magnetic isolation holes (12) is provided with a protruding portion protruding toward an outer side of the rotor body (1).

14. The rotor core as claimed in claim 10, wherein $0.6 \geq C/F \geq 0.4$.

15. The rotor core as claimed in claim 1, wherein an additional magnetic isolation groove (16) is provided between the each of the magnetic steel grooves (2) and a shaft hole of the rotor body (1), and a third magnetic isolation bridge is formed between the additional magnetic isolation groove (16) and a corresponding magnetic steel groove (2).

16. A tangential motor rotor, comprising a rotor core and a tangential magnetized permanent magnet disposed in a magnetic steel groove of the rotor core, wherein the rotor core is the rotor core as claimed in claim 1.

17. The tangential motor rotor as claimed in claim 16, wherein a width of the tangential magnetized permanent magnet closer to an outer side of the rotor core than a circle center of the rotor core is greater than a width of the tangential magnetized permanent magnet closer to a circle center of the rotor core than the outer side of the rotor core.

18. A tangential motor, comprising a tangential motor rotor and a stator, wherein the tangential motor rotor is the tangential motor rotor as claimed in claim 16.

* * * * *